United States Patent
Hsu

(10) Patent No.: US 11,513,616 B1
(45) Date of Patent: Nov. 29, 2022

(54) STYLUS

(71) Applicant: Chicony Electronics Co., Ltd., New Taipei (TW)

(72) Inventor: Cheng-Chi Hsu, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 17/535,722

(22) Filed: Nov. 26, 2021

(30) Foreign Application Priority Data

Jun. 2, 2021 (TW) .................................. 110120091

(51) Int. Cl.
| G06F 3/0354 | (2013.01) |
| H01R 13/24 | (2006.01) |
| H02J 7/00 | (2006.01) |

(52) U.S. Cl.
CPC ..... *G06F 3/03545* (2013.01); *H01R 13/2407* (2013.01); *H02J 7/0042* (2013.01); *H02J 7/00306* (2020.01)

(58) Field of Classification Search
CPC ............ G06F 3/03545; H01R 13/2407; H02J 7/0042; H02J 7/00306
See application file for complete search history.

(56) References Cited

U.S. PATENT DOCUMENTS

2020/0033964 A1 * 1/2020 Aoki ..................... G06F 3/0383

FOREIGN PATENT DOCUMENTS

CN 101980112 2/2011

* cited by examiner

*Primary Examiner* — Temesghen Ghebretinsae
*Assistant Examiner* — Ivelisse Martinez Quiles
(74) *Attorney, Agent, or Firm* — JCIPRNET

(57) ABSTRACT

A stylus, including a pen body, and a battery module and an electrically conductive structure disposed in the pen body, is provided. The pen body has a charging port. The battery module has at least one electrode. The electrically conductive structure includes a first electrically conductive assembly, a second electrically conductive assembly and a first electrically conductive elastic element. The first electrically conductive assembly is connected to the electrode, the second electrically conductive assembly is disposed between the first electrically conductive assembly and the charging port, and the first electrically conductive elastic element is connected to the second electrically conductive assembly and has a contact end. The contact end is in contact with the first electrically conductive assembly by an elastic force of the first electrically conductive elastic element, and the contact end is adapted to be separated from the first electrically conductive assembly by an external force.

14 Claims, 1 Drawing Sheet

STYLUS

CROSS-REFERENCE TO RELATED APPLICATION

This application claims the priority benefit of Taiwan application serial no. 110120091, filed on Jun. 2, 2021. The entirety of the above-mentioned patent application is hereby incorporated by reference herein and made a part of this specification.

BACKGROUND

Technical Field

This disclosure relates to a stylus, and in particular to a stylus with a rechargeable battery.

Description of Related Art

With the development of touch technology, many electronic devices may perform touch input using a stylus. For a stylus with a rechargeable lithium battery, the lithium battery becomes over-discharged and difficult to charge directly after a long time of disuse. Therefore, a large amount of time has to be spent by a user to activate the lithium battery before it may be successfully charged when the user uses the stylus for the first time. This causes inconvenience to the use of the stylus and the user may mistakenly believe that a charging function of stylus is impaired.

SUMMARY

This disclosure provides a stylus, which can prevent over-discharge of its battery module.

The stylus of the disclosure includes a pen body, a battery module and an electrically conductive structure. The pen body has a charging port. The battery module is disposed in the pen body and has at least one electrode. The electrically conductive structure is disposed in the pen body and includes a first electrically conductive assembly, a second electrically conductive assembly, and a first electrically conductive elastic element. The first electrically conductive assembly is connected to the electrode, the second electrically conductive assembly is disposed between the first electrically conductive assembly and the charging port, and the first electrically conductive elastic element is connected to the second electrically conductive assembly and has a contact end. The contact end is in contact with the first electrically conductive assembly by an elastic force of the first electrically conductive elastic element, and the contact end is adapted to be separated from the first electrically conductive assembly by an external force.

In an embodiment of the disclosure, the first electrically conductive elastic element is a torsion spring, and the contact end is a spring arm of the torsion spring.

In an embodiment of the disclosure, the stylus includes a force application element. The force application element extends into the pen body to push the contact end away from the first electrically conductive assembly, and the force application element is adapted to move away from the pen body and release the contact end.

In an embodiment of the disclosure, the force application element is a sheet-shaped element.

In an embodiment of the disclosure, the pen body has a channel, and the force application element is guided by the channel to extend into the pen body.

In an embodiment of the disclosure, the channel extends from an inner wall of the charging port to the first electrically conductive assembly.

In an embodiment of the disclosure, the channel extends from an outer surface of the pen body to the first electrically conductive assembly.

In an embodiment of the disclosure, the first electrically conductive assembly includes an electrically conductive member and a second electrically conductive elastic element, and the contact end is in contact with the electrically conductive member by the elastic force of the first electrically conductive elastic element. The second electrically conductive elastic element is connected between the at least one electrode and the electrically conductive member.

In an embodiment of the disclosure, the second electrically conductive elastic element is a compression spring.

In an embodiment of the disclosure, the electrically conductive member is an electrically conductive metal pipe.

In an embodiment of the disclosure, the battery module includes a battery body and a circuit board, the at least one electrode is disposed at the circuit board, and the battery body has at least one terminal and is connected to the at least one electrode by the at least one terminal.

In an embodiment of the disclosure, the second electrically conductive assembly is adjacent to the charging port.

In an embodiment of the disclosure, the second electrically conductive assembly is an electrically conductive terminal of the stylus at the charging port and configured to connect to an external charging connector at the charging port.

In an embodiment of the disclosure, the stylus comprises an internal charging connector adjacent to the charging port and electrically connected to the second electrically conductive assembly.

Based on the above, in the stylus of the disclosure, an electrode of the battery module does not directly extend to the charging port of the pen body. Instead, it extends to the charging port through the electrically conductive structure that contains the first electrically conductive elastic element. When the stylus is in disuse for a long time, an external force may be applied to the first electrically conductive elastic element to generate an elastic deformation and block the electrical connection of the electrically conductive structure, and preventing the over-discharge of the battery module accordingly. As a result, the user does not have any difficulty charging the battery module due to the over-discharge.

To make the abovementioned more comprehensible, several embodiments accompanied by drawings are described in detail as follows.

DESCRIPTION OF THE EMBODIMENTS

Figure 1:
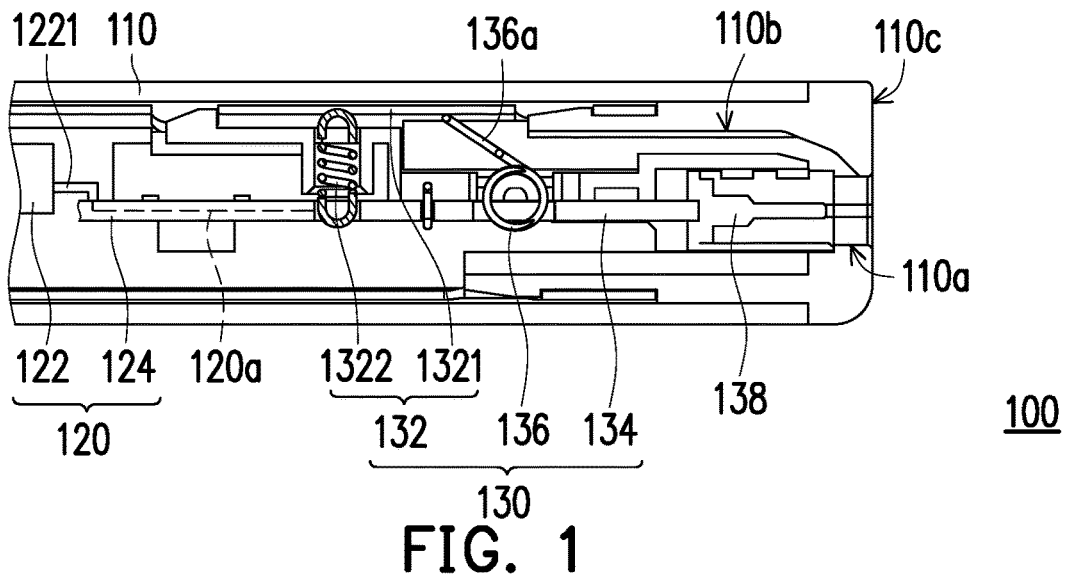
FIG. 1 is a partial cross-sectional view of a stylus according to an embodiment of the disclosure.

FIG. 1 is a partial cross-sectional view of a stylus according to an embodiment of the disclosure. With reference to FIG. 1, a stylus 100 of the embodiment includes a pen body 110, a battery module 120, and an electrically conductive structure 130. The pen body 110 has a charging port 110a. The battery module 120 is disposed in the pen body 110 and has an electrode 120a. The electrode 120a is, for example, one of a positive electrode and a negative electrode of the battery module 120. The battery module 120 may include a battery body 122 and a circuit board 124. The electrode 120a is disposed at the circuit board 124. The battery body 122 has at least one terminal 1221 and is connected to the electrode 120a by the terminal 1221. The electrically conductive structure 130 is disposed in the pen body 110 and is located between the electrode 120a and the charging port 110a. The battery module 120 may be charged through the electrode 120a and the electrically conductive structure 130.

Specifically, the electrically conductive structure 130 includes a first electrically conductive assembly 132, a second electrically conductive assembly 134, and a first electrically conductive elastic element 136. The first electrically conductive assembly 132 is connected to the electrode 120a of the battery module 120. The second electrically conductive assembly 134 is disposed between the first electrically conductive assembly 132 and the charging port 110a and is adjacent to the charging port 110a. The second electrically conductive assembly 134 is, for example, an electrically conductive terminal of the stylus 100 at the charging port 110a, configured to connect to an external charging connector at the charging port 110a. The first electrically conductive elastic element 136 is connected to the second electrically conductive assembly 134 and has a contact end 136a. The contact end 136a is in contact with the first electrically conductive assembly 132 by an elastic force of the first electrically conductive elastic element 136, so that the electrode 120a of the battery module 120 is electrically connected to the second electrically conductive assembly 134 through the first electrically conductive assembly 132 and the first electrically conductive elastic element 136. In this state, a user may insert the external charging connector into the charging port 110a and connect the external charging connector to the second electrically conductive assembly 134 through an internal charging connector 138 adjacent to the charging port 110a and electrically connected to the second electrically conductive assembly 134, therefore charging the battery module 120 accordingly.

Figure 2:
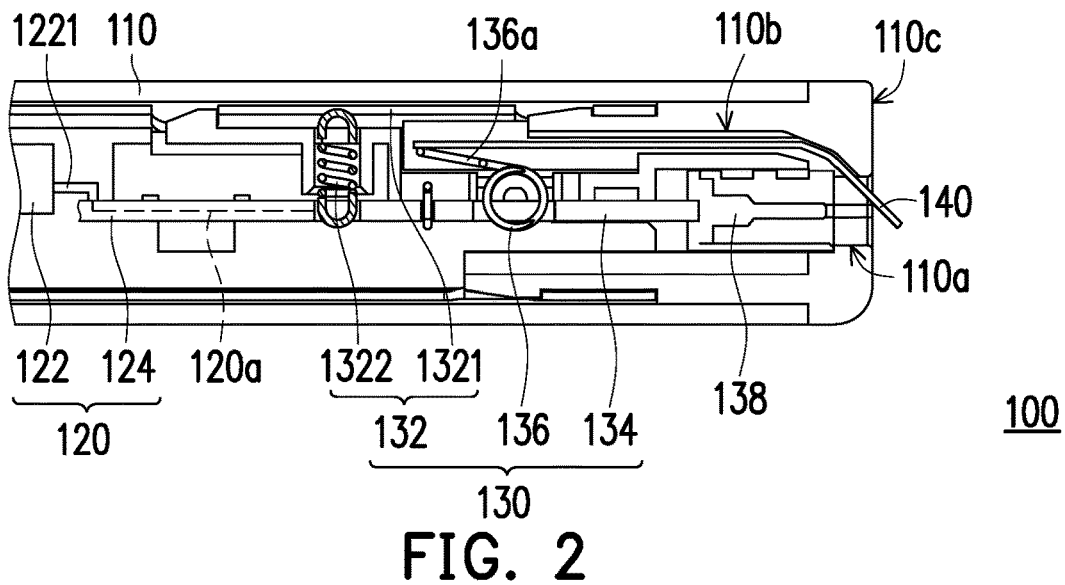
FIG. 2 shows the contact end of the first electrically conductive elastic element in FIG. 1 being separated from the first electrically conductive assembly.

FIG. 2 shows the contact end of the first electrically conductive elastic element in FIG. 1 being separated from the first electrically conductive assembly. With reference to FIG. 2, the stylus 100 of the embodiment further includes a force application element 140. The force application element 140 may extend into the pen body 110, as shown in FIG. 2, to apply an external force to the contact end 136a of the first electrically conductive elastic element 136, enabling the contact end 136a to be pushed away from the first electrically conductive assembly 132 by the external force. When the force application element 140 is moved away from the pen body 110, the contact end 136a of the first electrically conductive elastic element 136 is released and returns to the state shown in FIG. 1.

As mentioned above, in the stylus 100 of the embodiment, the electrode 120a of the battery module 120 does not directly extend to the charging port 110a of the pen body 110. Instead, the electrical connection of the electrode 120a extends to the charging port 110a through the electrically conductive structure 130 including the first electrically conductive elastic element 136. When the stylus 100 is in disuse for a long time, the force application element 140 may be used to apply an external force to the first electrically conductive elastic element 136, as shown in FIG. 2, to generate an elastic deformation and block the electrical connection of the electrically conductive structure 130, and preventing an over-discharge of the battery module 120 accordingly. As a result, the user does not have any difficulty in charging the battery module 120 due to the over-discharge.

In other embodiments, a force may be applied to the first electrically conductive elastic element 136 through other means to disconnect it from the first electrically conductive assembly 132, which is not limited by the disclosure. In addition, the disclosure does not limit a form of the first electrically conductive elastic element 136. The first electrically conductive elastic element 136 may be a torsion spring as shown in FIGS. 1 and 2, and the contact end 136a is a spring arm of the torsion spring. In other embodiments, the first electrically conductive elastic element may be other suitable elastic elements.

In the embodiment, the force application element 140 is, for example, a sheet-shaped element made of Mylar or other plastic materials. In addition, the pen body 110 has a channel 110b, and the channel 110b extends from an inner wall of the charging port 110a to the first electrically conductive assembly 132. The sheet-shaped force application element 140 may enter the channel 110b from the charging port 110a, so as to extend into the pen body 110 under the guidance of the channel 110b. In other embodiments, the force application element 140 may have other suitable shapes and may extend into the pen body 110 by other suitable means, which is not limited by the disclosure.

In the embodiment, the first electrically conductive assembly 132 includes an electrically conductive member 1321 and a second electrically conductive elastic element 1322. The electrically conductive member 1321 is, for example, an electrically conductive metal pipe or other forms of an electrically conductive member, and the second electrically conductive elastic element 1322 is, for example, an electrically conductive metal compression spring or other forms of an electrically conductive elastic element. The contact end 136a of the first electrically conductive elastic element 136 is in contact with the electrically conductive member 1321 by the elastic force of the first electrically conductive elastic element 136. The second electrically conductive elastic element 1322 is connected between the electrode 120a and the electrically conductive member 1321, so that an elastic deformation capability of the second electrically conductive elastic element 1322 may absorb a manufacturing and assembly tolerance of each component, and enables the second electrically conductive elastic element 1322 to reliably be in contact with the electrically conductive member 1321. In FIGS. 1 and 2, the electrode 120a in the circuit board 124 is schematically drawn with a dashed line. The electrode 120a may actually be a circuit layer in the circuit board 124 and be in direct contact with an end of the second electrically conductive elastic element 1322. In other embodiments, the first electrically conductive assembly 132 may be an integrally formed electrically conductive metal piece instead of having the electrically conductive member 1321 and the second electrically conductive elastic element 1322. In addition, in the embodiment, the second electrically conductive assembly 134 may be a portion of the circuit board 124 and have a circuit, which is configured to electrically connect to between the first electrically conductive elastic element 136 and the internal charging connector 138. In other embodiments, the second electrically conductive assembly 134 may be any other suitable forms of an electrically conductive assembly, which is not limited by the disclosure.

Figure 3:
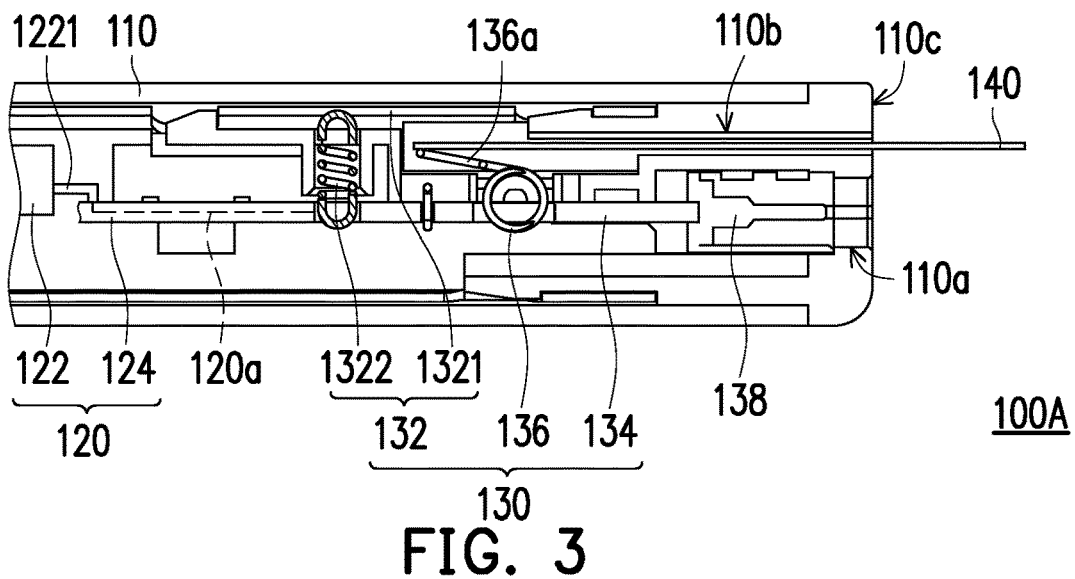
FIG. 3 is a partial cross-sectional view of a stylus according to another embodiment of the disclosure.

FIG. 3 is a partial cross-sectional view of a stylus according to another embodiment of the disclosure. A difference between a stylus 100A shown in FIG. 3 and the stylus 100 shown in FIG. 2 is that in the stylus 100A, a channel 110b configured to guide the force application element 140 extends from an outer surface 110c of the pen body 110 to the first electrically conductive assembly 132 instead of extending from the inner wall of the charging port 110a to the first electrically conductive assembly 132 as shown in FIG. 2. That is to say, the channel 110b and the charging port 110a of the embodiment are disposed independent of each other, and the force application element 140 does not enter the channel 110b from the charging port 110a. Instead, it directly enters the channel 110b from the outer surface 110c of the pen body 110.

In summary, in the stylus of the disclosure, an electrode of the battery module does not directly extend to the charging port of the pen body. Instead, the electrical connection of the electrode extends to the charging port through the electrically conductive structure including the first electrically conductive elastic element. When the stylus is in disuse for a long time, the force application element may be inserted into the pen body to apply an external force to the first electrically conductive elastic element to enable it to generate an elastic deformation and block the electrical connection of the electrically conductive structure, preventing the over-discharge of the battery module accordingly. As a result, the user does not have any difficult in charging the battery module due to the over-discharge.

Although the disclosure has been described with reference to the abovementioned embodiments, but it is not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A stylus, comprising:
   a pen body, having a charging port;
   a battery module, disposed in the pen body and has at least one electrode; and
   an electrically conductive structure, disposed in the pen body and comprising a first electrically conductive assembly, a second electrically conductive assembly, and a first electrically conductive elastic element,
   wherein the first electrically conductive assembly is connected to the at least one electrode, the second electrically conductive assembly is disposed between the first electrically conductive assembly and the charging port, the first electrically conductive elastic element is connected to the second electrically conductive assembly and has a contact end, the contact end is in contact with the first electrically conductive assembly by an elastic force of the first electrically conductive elastic element, and the contact end is adapted to be separated from the first electrically conductive assembly by an external force.

2. The stylus according to claim 1, wherein the first electrically conductive elastic element is a torsion spring, and the contact end is a spring arm of the torsion spring.

3. The stylus according to claim 1, comprising:
   a force application element, wherein the force application element extends into the pen body to push the contact end away from the first electrically conductive assembly, and the force application element is adapted to move away from the pen body and release the contact end.

4. The stylus according to claim 3, wherein the force application element is a sheet-shaped element.

5. The stylus according to claim 3, wherein the pen body has a channel, and the force application element is guided by the channel to extend into the pen body.

6. The stylus according to claim 5, wherein the channel extends from an inner wall of the charging port to the first electrically conductive assembly.

7. The stylus according to claim 5, wherein the channel extends from an outer surface of the pen body to the first electrically conductive assembly.

8. The stylus according to claim 1, wherein the first electrically conductive assembly comprises an electrically conductive member and a second electrically conductive elastic element, the contact end is in contact with the electrically conductive member by the elastic force of the first electrically conductive elastic element, and the second electrically conductive elastic element is connected between the at least one electrode and the electrically conductive member.

9. The stylus according to claim 8, wherein the second electrically conductive elastic element is a compression spring.

10. The stylus according to claim 8, wherein the electrically conductive member is an electrically conductive metal pipe.

11. The stylus according to claim 1, wherein the battery module comprises a battery body and a circuit board, the at least one electrode is disposed on the circuit board, and the battery body has at least one terminal and is connected to the at least one electrode by the at least one terminal.

12. The stylus according to claim 1, wherein the second electrically conductive assembly is adjacent to the charging port.

13. The stylus according to claim 1, wherein the second electrically conductive assembly is an electrically conductive terminal of the stylus at the charging port and configured to connect to an external charging connector at the charging port.

14. The stylus according to claim 1, comprising an internal charging connector adjacent to the charging port and electrically connected to the second electrically conductive assembly.

* * * * *